(12) United States Patent
Xu et al.

(10) Patent No.: US 8,724,985 B2
(45) Date of Patent: May 13, 2014

(54) WAVELENGTH DIVISION MULTIPLEXING FILTER

(75) Inventors: Jidong Xu, Shenzhen (CN); Dezhi Zhang, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 109 days.

(21) Appl. No.: 13/258,889

(22) PCT Filed: Dec. 21, 2009

(86) PCT No.: PCT/CN2009/075780
§ 371 (c)(1),
(2), (4) Date: Feb. 27, 2012

(87) PCT Pub. No.: WO2011/026287
PCT Pub. Date: Mar. 10, 2011

(65) Prior Publication Data
US 2012/0148250 A1    Jun. 14, 2012

(30) Foreign Application Priority Data

Sep. 4, 2009 (CN) .......................... 2009 1 0168990
Nov. 17, 2009 (CN) .......................... 2009 1 0224322

(51) Int. Cl.
*H04B 10/00* (2013.01)
*H04J 14/00* (2006.01)
*G01N 21/00* (2006.01)

(52) U.S. Cl.
USPC ........ 398/16; 398/9; 398/13; 398/17; 398/20; 398/21; 398/25; 398/63; 398/67; 356/73.1

(58) Field of Classification Search
None
See application file for complete search history.

(56) References Cited

U.S. PATENT DOCUMENTS

2008/0291431 A1* 11/2008 Wang et al. ................... 356/73.1
2011/0013904 A1* 1/2011 Khermosh et al. ............... 398/16

FOREIGN PATENT DOCUMENTS

CN    1845485 A    10/2006
CN    1866790 A    11/2006

(Continued)

OTHER PUBLICATIONS

Ki-Man Choi; Jung-Hyung Moon; Jong-Hoon Lee; Chang-Hee Lee, "An Efficient Evolution Method from a TDM-PON with a Video Overlay to NGA," Optical Fiber communication/National Fiber Optic Engineers Conference, 2008. OFC/NFOEC 2008. Conference on , vol., No., pp. 1,3, Feb. 24-28, 2008.*

(Continued)

*Primary Examiner* — Ken Vanderpuye
*Assistant Examiner* — Merlin Brito Peguero
(74) *Attorney, Agent, or Firm* — Christopher L. Parmelee; Walker & Jocke

(57) ABSTRACT

The present invention discloses a Wavelength Division Multiplexing Filter which can satisfy coexistence requirements of different PON systems and an optical line detecting system. The Wavelength Division Multiplexing Filter comprises a plurality of filters that are configured: in a downlink direction, to receive a first optical pulse signal output by a first PON system, a second optical pulse signal output by a second PON system or gained by coupling an output signal of the second PON system and a video signal, and a third optical pulse signal sent from an Optical Time Domain Reflectometer, and to couple the first optical pulse signal, the second optical pulse signal and the third optical pulse signal into an Optical Division Network; and in an uplink direction, to split an uplink optical pulse signal according to wavelength bands, to transmit an optical pulse signal in a first uplink wavelength range to the first PON system, to transmit an optical pulse signal in a second uplink wavelength range to the second PON system, and to transmit an optical signal in a third uplink wavelength range to the Optical Time Domain Reflectometer.

12 Claims, 3 Drawing Sheets

(56) References Cited

FOREIGN PATENT DOCUMENTS

| WO | 2008/146967 | A1 | 12/2008 | | |
| WO | WO 2008146967 | A1 | * 12/2008 | .............. | H04J 14/02 |

OTHER PUBLICATIONS

Choi, et al. "An Efficient Evolution Method from a TDM-PON with a Video Overlay to NGA", OFC/NFOEC, 2008, IEEE, Piscataway, New Jersey, USA.

Telecommunication Standardization Sector of ITU (ITU-T). "Enhancement Band for Gigabit Capable Optical Access Networks", International Telecommunication Union (Recommendation G.984.5), 2007, Geneva, Ch.

Telecommunication Standardization Sector of ITU (ITU-T). "Optical Fibre Cable Maintenance Criteria for In-Service Fibre Testing in Access Networks", International Telecommunication Union (Recommendation L.66), 2007, Geneva, CH.

European Patent Office. "Supplementary European Search Report", for European Application No. 09 84 8892, Feb. 13, 2013.

* cited by examiner

WAVELENGTH DIVISION MULTIPLEXING FILTER

FIELD OF THE INVENTION

The present invention relates to a Passive Optical Network (PON) system in the communication field, and in particular to a wavelength division multiplexing filter (Wavelength Division Multiplexing First Revision, WDM1r).

BACKGROUND OF THE INVENTION

With the development of the modern society, the diversification of people's life and popularization of information communication make the broadband internet access become a part in people's life. This makes the broadband access technology to develop towards a direction of becoming broader and faster. The original Gigabit Passive Optical Network (GPON) can less satisfy some people's increasing requirements, and then it is a trend to upgrade the GPON to be 10 Gigabit Passive Optical Network (XGPON1) in the near future. It will be an inevitable reality for a quite long time that both GPON and XGPON1 coexist in one Optical Distribution Network (ODN) since not every user demands upgrading immediately.

In addition, after a large number of the Passive Optical Networks are arranged and deployed, the operator will consider the operation and maintenance of the networks, especially the detection of an optical fiber line and fault location. In order to reduce the maintenance cost, the operator would like to detect the whole Passive Optical Network with an Optical Time Domain Reflectometer (OTDR) in a Central Office (CO) so as to facilitate the detection and conduct a real-time detection without interrupting the service.

Therefore, a wavelength division multiplexing filter that can satisfy coexistent requirements of the GPON and the XGPON1 and has an OTDR interface is demanded.

SUMMARY OF THE INVENTION

The technical problem to be solved by the present invention is to provide a wavelength division multiplexing filter that can satisfy coexistence requirements of different Passive Optical Networks and an optical line detecting system.

In order to solve the technical problem, the present invention provides a wavelength division multiplexing filter including a plurality of filters. The wavelength division multiplexing filter is configured as follows.

In a downlink direction, receive a first optical pulse signal outputted by a first Passive Optical Network (PON) system, a second optical pulse signal outputted by a second PON system or a second optical pulse signal gained by coupling an output signal of the second PON system and a video signal, and a third optical pulse signal sent from an Optical Time Domain Reflectometer (OTDR); and couple the first optical pulse signal, the second optical pulse signal and the third optical pulse signal into an Optical Division Network (ODN); and in an uplink direction, split an uplink optical pulse signal according to wavelength bands; and transmit an optical pulse signal in a first uplink wavelength range to the first PON system, transmit an optical pulse signal in a second uplink wavelength range to the second PON system, and transmit an optical signal in a third uplink wavelength range to the OTDR, so as to realize wavelength multiplexing of different PON systems and an optical fiber detecting system.

Also, the wavelength of the third optical pulse signal is not less than 1625 nm.

The Wavelength Division Multiplexing Filter is also configured to: in a downlink direction, receive a reflection signal to the third optical pulse signal sent from the ODN, wherein a wavelength of the reflection signal is not less than 1625 nm.

Also, the Wavelength Division Multiplexing Filter consists of a broadband filter and a side band filter, wherein the broadband filter transmits all light of a wavelength of 1290 nm-1500 nm, and reflects all light of other wavelengths; and the side band filter transmits all light of a wavelength not less than 1625 nm, and reflects all light of a wavelength less than this wavelength;

a Pass interface of the broadband filter is an interface connected with an Optical Line Terminal (OLT) of the first PON system; a Common interface of the broadband filter is an interface connected with a main optical fiber of the ODN; a Reflection interface of the broadband filter is connected with a Common interface of the side band filter; a Reflection interface of the side band filter is an interface connected with an OLT of the second PON system; and a Pass interface of the side band filter is an interface connected with the OTDR.

Also, the Reflection interface of the side band filter and the OLT of the second PON system are connected via a coupler.

The Reflection interface of the side band filter is configured to: in a downlink, input an optical pulse signal gained by coupling an output signal of the OLT of the second PON system and a video signal, and in an uplink, output an optical pulse signal to the OLT of the second PON system.

Also, the Wavelength Division Multiplexing Filter consists of a double-window Fiber Bragg Grating (FBG) filter and a side band filter, wherein the FBG filter has two windows in which a first window transmits all light of a wavelength of 1290 nm-1360 nm, and a second window transmits all light of a wavelength of 1480 nm-1500 nm, and reflects all light of other wavelengths; and the side band filter transmits all light of a wavelength not less than 1625 nm, and reflects all light of a wavelength less than this wavelength; and the Pass interface of the FBG filter is an interface connected with an OLT of the first PON system; its Common interface of the FBG filter is an interface connected with a main optical fiber of the ODN; its Reflection interface of the FBG filter is connected with a Common interface of the side band filter; a Reflection interface of the side band filter is an interface connected with an OLT of the second PON system; and a Pass interface of the side band filter is an interface connected with the OTDR.

Also, the Reflection interface of the side band filter and the OLT of the second PON system are connected via a coupler.

The Reflection interface of the side band filter is configured to: in a downlink, input an optical pulse signal gained by coupling an output signal of the OLT of the second PON system and a video signal, and in an uplink, output an optical pulse signal to the OLT of the second PON system.

Also, the Wavelength Division Multiplexing Filter consists of three broadband filters and one side band filter, wherein both first broadband filter and second broadband filter transmit all light of a wavelength of 1290 nm-1360 nm, and reflect all light of other wavelengths; a third broadband filter transmits all light of a wavelength of 1480 nm-1500 nm, and reflects all light of other wavelengths; and the side band filter transmits light of a wavelength not less than 1625 nm, and reflects all light of a wavelength less than this wavelength; and a Common interface of the first broadband filter is an interface connected with a main optical fiber of the ODN; a Pass interface of the first broadband filter is connected with a Pass interface of the second broadband filter; a Reflection interface of the first broadband filter is connected with a Common interface of the third broadband filter; a Common interface of the second broadband filter is an interface connected with an OLT of the first PON system; a Reflection interface of the second broadband filter is connected with a Pass interface of the third broadband filter; a Reflection interface of the third broadband filter is connected with a Common interface of the side band filter; a Reflection interface of the side band filter is an interface connected with an OLT of the second PON system; and the Pass interface of the side band filter is an interface connected with the OTDR.

Also, the Reflection interface of the side band filter and the OLT of the second PON system are connected via a coupler.

The Reflection interface of the side band filter is configured to: in a downlink, input an optical pulse signal gained by coupling an output signal of the OLT of the second PON system and a video signal, and in an uplink, output an optical pulse signal to the OLT of the second PON system.

Also, the Wavelength Division Multiplexing Filter consists of four side band filters, wherein both first side band filter and second side band filter transmit all light of a wavelength no more than 1280 nm, and reflect all light of other wavelengths; a third side band filter transmits all light of a wavelength no more than 1500 nm, and reflects all light of other wavelengths; and a fourth side band filter transmits all light of a wavelength not less than 1625 nm, and reflects all light of a wavelength less than this wavelength; and a Common interface of the first side band filter is an interface connected with a main optical fiber of the ODN; a Pass interface of the first side band filter is connected with a Pass interface of the second side band filter; a Reflection interface of the first side band filter is connected with a Common interface of the third side band filter; a Common interface of the second side band filter is an interface connected with an OLT of the second PON system; a Reflection interface of the second side band filter is connected with a Reflection interface of the fourth broadband filter; a Pass interface of the third broadband filter is an interface connected with an OLT of the first PON system; a Reflection interface of the third side band filter is connected with a Common interface of the fourth side band filter; and a Pass interface of the fourth side band filter is an interface connected with the OTDR.

Also, the Common interface of the second side band filter and the OLT of the second PON system are connected via a coupler.

The Common interface of the second side band filter is configured to: in a downlink, input an optical pulse signal gained by coupling an output signal of the OLT of the second PON system and a video signal, and in an uplink, output an optical pulse signal to the OLT of the second PON system.

Also, a wavelength range of the first optical pulse signal comprises 1480 nm-1500 nm; and a wavelength range of the second optical pulse signal comprises 1510 nm-1615 nm.

Also, the first uplink wavelength range comprises 1290 nm-1360 nm; the second uplink wavelength range comprises: shorter than 1280 nm; and the third uplink wavelength range comprises: not less than 1625 nm.

Also, the first PON system is a Gigabit Passive Optical Network (GPON), and the second PON system is 10 Gigabit Passive Optical Network (XGPON1); or the first PON system is an Ethernet Passive Optical Network (EPON), and the second PON system is a 10 Gigabit Ethernet Passive Optical Network (10GEPON).

The wavelength division multiplexing filter (WDM1r) in the present invention realizes coexistence of different Passive Optical Networks and an optical line detecting system and can detect a fault in real time without interrupting the service. Therefore, the present invention can save a lot of maintenance costs for the operators.

DETAILED DESCRIPTION OF PREFERRED EMBODIMENTS

The embodiments of the present invention will be described in detail hereinafter in conjunction with the figures.

The following embodiments take coexistence of a GPON and an XGPON1 as example.

A wavelength division multiplexing (WDM) coexistence will be a practical and feasible method since the GPON and XGPON1 have different wavelengths. A wavelength division multiplexing filter (WDM1r), which is the most important optical device for accomplishing the method, has a main function of guiding uplink light of different wavelengths to corresponding different optical line terminals (OLT), and simultaneously coupling downlink light of different wavelengths into one ODN.

The present invention provides a wavelength division multiplexing filter configured to realize coexistence of a Gigabit Passive Optical Network and a 10 Gigabit Passive Optical Network. The wavelength division multiplexing filter comprises a plurality of filters that are configured to: in a downlink direction, receive a first optical pulse signal output by the GPON and having a wavelength in a range of 1480 nm-1500 nm, and a second optical pulse signal output by the XGPON1 or a second optical pulse signal gained by coupling an output signal of the XGPON1 and a video signal and having a wavelength in a range of 1550 nm-1580 nm; and couple the first optical pulse signal and the second optical pulse signal into an Optical Division Network (ODN); and in an uplink direction, split an uplink optical pulse signal, and transmit an optical pulse signal in an uplink wavelength range of 1290 nm-1360 nm to an OLT of the GPON, and transmit an optical pulse signal in an uplink wavelength range of 1260 nm-1280 nm to an OLT of the XGPON1.

Preferably, the wavelength division multiplexing filter is also configured to receive an optical pulse signal sent from an Optical Time Domain Reflectometer (OTDR) and having a wavelength not less than 1625 nm, to transmit the optical pulse signal to the Passive Optical Network, and to receive a reflection signal of the optical pulse signal of the OTDR.

Figure 1:
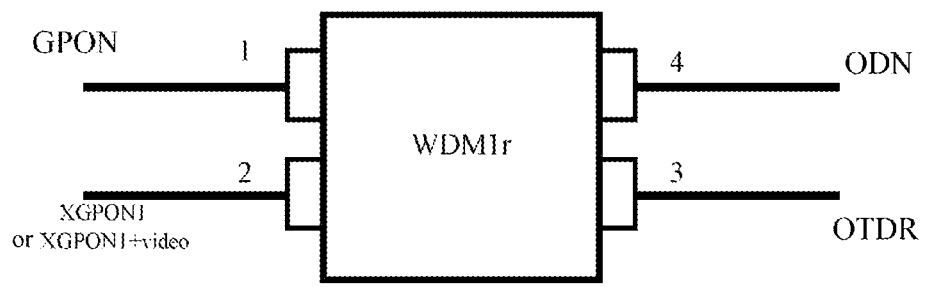
FIG. 1 is a structure schematic diagram of external interfaces of a WDM1r.

As shown in FIG. 1, the WDM1r provided in the present invention is a passive device, consists of more than two filters, and has four interfaces.

Interface 1, connected with an OLT interface of the GPON, is configured for uplink transmission of an optical pulse having a wavelength in a range of 1290 nm-1360 nm, and for downlink transmission of an optical pulse having a wavelength in a range of 1480 nm-1500 nm, and the unit nm herein represents nanometer.

Interface 2, directly connected with an OLT interface of the XGPON1 or connected with an interface of a signal gained by coupling an output signal of the OLT and a video signal, is configured for uplink transmission of an optical pulse having a wavelength in a range of 1260 nm-1280 nm, and downlink transmission of an optical pulse having a wavelength in a range of 1550 nm-1580 nm.

Interface 3, connected with OTDR testing instrument, is configured to transmit an optical pulse signal sent from the OTDR and having a wavelength not less than 1625 nm, and an OTDR signal reflected back, i.e. a reflection signal of the optical pulse signal.

Interface 4 is connected with a main optical fiber of the ODN, and signals and wavelengths of all the interfaces above communicate with the main optical fiber of the ODN via interface 4.

Specifically, when interface 2 is directly connected with the OLT interface of the XGPON1, a downlink input signal of interface 2 is an output signal (1550 nm-1580 nm) of the XGPON1, and its biggest wavelength range may be 1510 nm-1615 nm, and in the uplink, an output signal of 1260 nm-1280 nm is split to the OLT of the XGPON1; when a video signal is inputted, a coupler is added, and in a downlink direction, an output signal of the XGPON1 and the video signal pass through the coupler and are inputted to interface 2, and in an uplink direction, the wavelength division multiplexing filter splits an uplink signal of the ODN. One split is allocated to the OLT of the GPON via interface 1, and the other split is allocated directly to the OLT of the XGPON via interface 2 without passing through the coupler.

Figure 2:
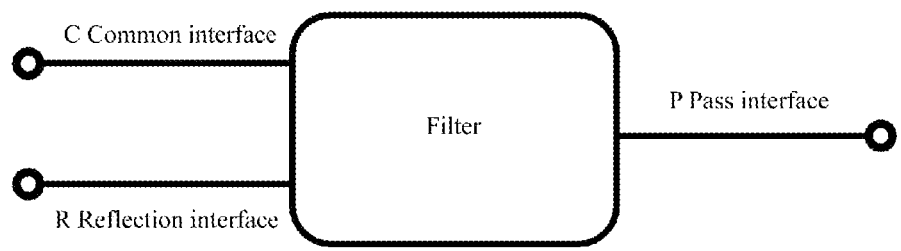
FIG. 2 is a structure schematic diagram of external interfaces of a typical filter.

The existing filters are manufactured mainly by two technologies. One is Thin Film Filter (TFF). By the Thin Film Filter, primarily, a glass substrate is coated with several layers of thin films of different thicknesses and different materials so as to enable the Thin Film Filter to transmit light of certain wavelengths and reflect light of certain wavelengths. There are mainly two types of Thin Film Filter, one being side band filter that reflects or transmits light of a wavelength not less than a certain wavelength, and transmits or reflects light of a wavelength less than this wavelength, and the other being bandwidth filter that only transmits light of a wavelength within a certain bandwidth, and reflects all light of the remaining wavelengths. Fiber Bragg Grating (FBG) uses the other filter manufacturing technology. By the Fiber Bragg Grating, primarily, a grating template designed in advance is irradiated with ultraviolet light onto a photosensitive optical fiber, and then a refractive index of the photosensitive optical fiber has the same change as the grating template, i.e. a grating is formed to reflect light of certain wavelengths and transmit light of certain wavelengths. And, it also has the function of filtration. Regardless the manufacturing technologies, the finally assembled filter only has three external interfaces, as shown in FIG. 2. At one end, the filter has only one interface called P (Pass) interface connected with an input optical fiber, and this interface only allows in and out of transmitted light. And at the other end, it has two interfaces. One is called C (Common) interface allowing in and out of transmitted light and reflected light, and the other is called R (Reflection) interface only allowing in and out of reflected light, as shown in FIG. 2.

According to the above requirements of the WDM1r and properties of existing TFF and FBG filters, several filters having different properties are combined to enable light of different wavelengths to go through different interfaces so as to make light of different wavelengths of the GPON, XGPON1 and OTDR coexist in one ODN without affecting or interfering each other and independent from each other. The following four structures of the WDM1r can well satisfy requirements of the coexistence of the GPON and the XGPON1 and the OTDR detection.

The loss of the filter is related to a traveling mode of light. Generally, the loss in light reflection is 0.3 dB, and the loss in light transmission is 0.5 dB. The following optical link losses are calculated on this basis.

The technical solutions of the present invention will be explained in detail in conjunction with the drawings and preferred embodiments hereinafter. The following embodiments merely illustrate and explain the present invention, and do not constitute limitation on the technical solutions of the present invention.

The path losses are illustrated only taking some specific central wavelengths as examples in the tables. The central wavelength refers to an operating wavelength of an emitter in a normal temperature/working condition. A first interface has an uplink central wavelength of 1310 nm, a downlink central wavelength of 1490 nm; and a second interface has an uplink central wavelength of 1270 nm, a downlink central wavelength of 1577 nm or 1555 nm.

Solution 1

Figure 3:
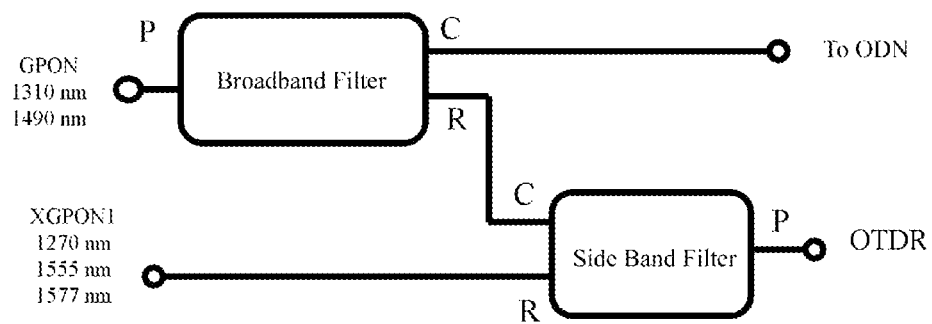
FIG. 3 is a schematic diagram of an internal structure of a WDM1r in solution 1.

A WDM1r consists of two Thin Film Filters, one being a broadband filter and the other being a side band filter. The broadband filter transmits all light of a wavelength of 1290 nm-1500 nm, and reflects all light of other wavelengths. The side band filter transmits light of a wavelength not less than 1625 nm, and reflects all light of a wavelength less than this wavelength. The broadband filter and the side band filter are connected as shown in FIG. 3. The 1310 and 1490, 1270, 1555, and 1577 shown in the figure are central wavelengths. In the broadband filter, its P interface is an interface to the OLT of GPON, and its C interface is an interface for going into and out of an ODN. R interface of the broadband filter is connected with C interface of the side band filter. R interface of the side band filter is an interface to the OLT of XGPON1, and its P interface is an interface to OTDR. Table 1 shows optical paths of light of different wavelengths and relevant losses.

TABLE 1

Optical Links and Relevant Losses of WDM1r in Solution 1

| Wavelength | Broadband Filter | Side Band Filter | Loss (dB) |
|---|---|---|---|
| 1270 nm | C→R (1) | C→R (2) | 0.3 + 0.3 = 0.6 |
| 1310 nm | C→P | — | 0.5 |
| 1490 nm | P→C | — | 0.5 |
| 1555 nm | R→C (2) | R→C (1) | 0.3 + 0.3 = 0.6 |
| 1577 nm | R→C (2) | R→C (1) | 0.3 + 0.3 = 0.6 |
| 1625 nm Emitted | R→C (2) | P→C (1) | 0.5 + 0.3 = 0.8 |
| 1625 nm Returned | C→R (1) | C→P (2) | 0.3 + 0.5 = 0.8 |

Particularly, (1), (2) . . . represent a traveling order of an optical link. For instance, an optical link shown in the first line of the table which is an optical pulse having a wavelength of 1270 nm travels from C interface to R interface of the broadband filter, and then from C interface to R interface of the side band filter.

Optical link losses in this solution are 0.5-0.8 dB which is the smallest in all solutions. But the process of manufacturing the broadband Thin Film Filter with wide band range is complex and difficult, and is thus costly at present.

Solution 2

Figure 4:
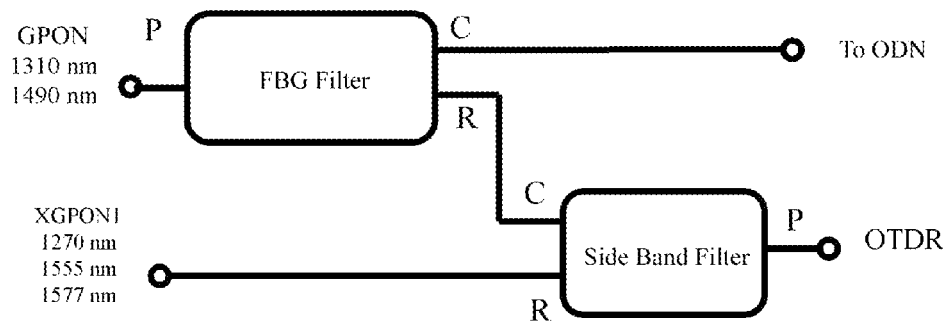
FIG. 4 is a schematic diagram of an internal structure of a WDM1r in solution 2.
Figure 5:
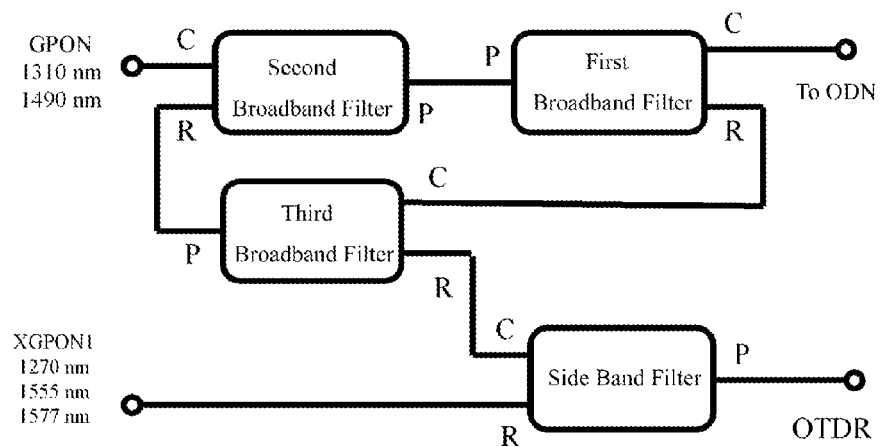
FIG. 5 is a schematic diagram of an internal structure of a WDM1r in solution 3.

A WDM1r consists of two filters, one being a double-window FBG filter and the other being a side band filter. The FBG filter has two windows in which one transmits all light of a wavelength of 1290 nm-1360 nm, and the other transmits all light of a wavelength of 1480 nm-1500 nm, and reflects all light of other wavelengths. The same as in Solution 1, the side band filter merely transmits light of a wavelength not less than 1625 nm, and reflects all light of a wavelength less than this wavelength. The FBG filter and the side band filter are connected as shown in FIG. 4. In the FBG filter, its P interface is an interface to the OLT of GPON, and its C interface is an interface for going into and out of an ODN. R interface of the FBG filter is connected with C interface of the side band filter. R interface of the side band filter is an interface to the OLT of XGPON1, and its P interface is an interface to OTDR. Table 2 shows optical links of light of different wavelengths and relevant losses.

and the side band filter are connected as shown in FIG. 5. In the first broadband filter, its C interface is an entrance for going into and out of an ODN, its P interface is connected with P interface of the second broadband filter, and its R interface is connected with C interface of broadband filter B. In the second broadband filter, its C interface is an interface to the OLT of GPON, and its R interface is connected with P interface of the third broadband filter. R interface of the third broadband filter is connected with C interface of the side band filter. In the side band filter C, its R interface is an interface to the OLT of XGPON1, and its P interface is an interface to an OTDR. Table 3 shows optical links of light of different wavelengths travels and relevant losses.

TABLE 3

Optical Links and Relevant Losses of WDM1r in Solution 3

| Wavelength | Broadband Filter A1 | Broadband Filter A2 | Broadband Filter B | Side Band Filter | Loss (dB) |
|---|---|---|---|---|---|
| 1270 nm | C→R (1) | — | C→R (2) | C→R (3) | 3*0.3 = 0.9 |
| 1310 nm | C→P (1) | P→C (2) | — | — | 2*0.5 = 1.0 |
| 1490 nm | R→C (3) | C→R (1) | P→C (2) | — | 2*0.3 + 0.5 = 1.1 |
| 1555 nm | R→C (3) | — | R→C (2) | R→C (1) | 3*0.3 = 0.9 |
| 1577 nm | R→C (3) | — | R→C (2) | R→C (1) | 3*0.3 = 0.9 |
| 1625 nm Emitted | R→C (3) | — | R→C (2) | P→C (1) | 2*0.3 + 0.5 = 1.1 |
| 1625 nm Returned | C→R (1) | — | C→R (2) | C→P (3) | 2*0.3 + 0.5 = 1.1 |

TABLE 2

Optical Links and Relevant Losses of WDM1r in Solution 2

| Wavelength | FBG Filter | Side Band Filter | Loss (dB) |
|---|---|---|---|
| 1270 nm | C→R (1) | C→R (2) | 0.3 + 0.3 = 0.6 |
| 1310 nm | C→P | — | 0.5 |
| 1490 nm | P→C | — | 0.5 |
| 1555 nm | R→C (2) | R→C (1) | 0.3 + 0.3 = 0.6 |
| 1577 nm | R→C (2) | R→C (1) | 0.3 + 0.3 = 0.6 |
| 1625 nm Emitted | R→C (2) | P→C (1) | 0.5 + 0.3 = 0.8 |
| 1625 nm Returned | C→R (1) | C→P (2) | 0.3 + 0.5 = 0.8 |

Particularly, (1), (2) . . . represent a traveling order of an optical link.

Optical link losses in this solution are 0.5-0.8 dB which is also the smallest in all solutions. But the two filters, especially of the FBG filter, are manufactured by different technologies, thus the manufacturing cost is quite high.

Solution 3

A WDM1r consists of four Thin Film Filters. A first broadband filter and a second broadband filter transmit all light of a wavelength of 1290 nm-1360 nm, and reflect all light of other wavelengths. A third broadband filter transmits all light of a wavelength of 1480 nm-1500 nm, and reflects all light of other wavelengths. And a side band filter transmits light of a wavelength not less than 1625 nm, and reflects all light of a wavelength less than this wavelength. The first broadband filter, the second broadband filter, the third broadband filter Particularly, (1), (2) . . . represent a traveling order of an optical link.

Optical link losses in this solution are 0.9-1.1 dB. The cost of this solution is slightly high since this solution consists of three types of Thin Film Filters.

Solution 4

Figure 6:
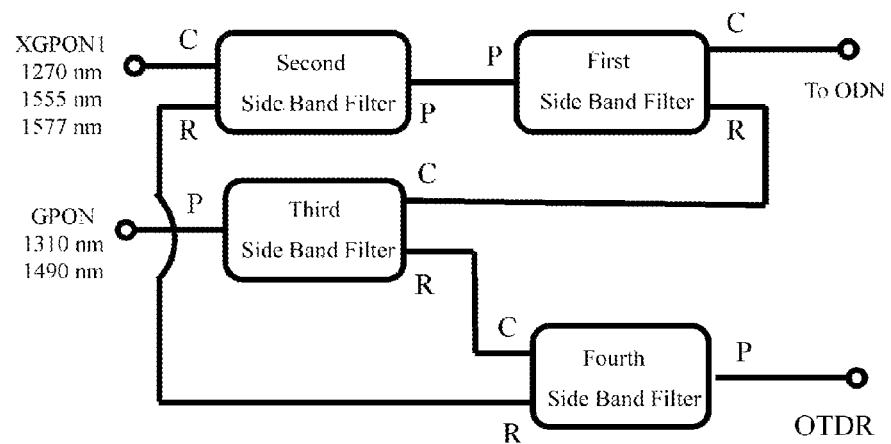
FIG. 6 is a schematic diagram of an internal structure of a WDM1r in solution 4.

A WDM1r consists of four Thin Film Filters comprising three types of side band filters, as shown in FIG. 6. A first side band filter and a second side band filter transmit all light of a wavelength no more than 1280 nm, and reflect all light of other wavelengths. A third side band filter transmits all light of a wavelength no more than 1500 nm, and reflects all light of other wavelengths. A fourth side band filter transmits light of a wavelength not less than 1625 nm, and reflects all light of a wavelength less than this wavelength. The first side band filter, the second side band filter, the third side band filter and the fourth side band filter are connected as shown in FIG. 6. In the first side band filter, its C interface is an entrance for going into and out of an ODN, its P interface is connected with P interface of the second side band filter, and its R interface is connected with C interface of the third side band filter. In the second side band filter, its C interface is an interface to the OLT of XGPON1, and its R interface is connected with R interface of the fourth side band filter. In the third side band filter, its P interface is an interface to the OLT of GPON, and its R interface is connected with C interface of the fourth side band filter. P interface of the fourth side band filter is an interface to OTDR. Table 4 shows optical links of light of different wavelengths travels and relevant losses.

TABLE 4

Optical Links and Relevant Losses of WDM1r in Solution 4

| Wavelength | Side Band Filter A1 | Side Band Filter A2 | Side Band Filter B | Side Band Filter C | Loss (dB) |
|---|---|---|---|---|---|
| 1270 nm | C→P (1) | P→C (2) | — | — | 3*0.5 = 1.0 |
| 1310 nm | C→R (1) | — | C→P (2) | — | 0.3 + 0.5 = 0.8 |

TABLE 4-continued

Optical Links and Relevant Losses of WDM1r in Solution 4

| Wavelength | Side Band Filter A1 | Side Band Filter A2 | Side Band Filter B | Side Band Filter C | Loss (dB) |
|---|---|---|---|---|---|
| 1490 nm | R→C (2) | — | P→C (1) | — | 0.3 + 0.5 = 0.8 |
| 1555 nm | R→C (4) | C→R (1) | R→C (3) | R→C (2) | 4*0.3 = 1.2 |
| 1577 nm | R→C (4) | C→R (1) | R→C (3) | R→C (2) | 4*0.3 = 1.2 |
| 1625 nm Emitted | R→C (3) | — | R→C (2) | P→C (1) | 2*0.3 + 0.5 = 1.1 |
| 1625 nm Returned | C→R (1) | — | C→R (2) | C→P (3) | 2*0.3 + 0.5 = 1.1 |

Particularly, (1), (2) . . . represent a traveling order of an optical link.

Optical link losses of all wavelengths in this solution are 0.8-1.5 dB. As this solution only uses the side band filters, the manufacturing process is relatively simple, and the manufacturing cost is quite low, while the losses are slightly big than the other solutions, but still meet the requirement that the biggest loss of the WDM1r should be controlled at about 1.5 dB.

Any one of the solutions above can satisfy all functions of the Wavelength Division Multiplexing Filter (WDM1r), and the user may choose one solution therefrom according to factors such as loss, manufacturing cost, production difficulty to meet requirements.

It should be noted that the transmitted wavelength ranges above should be guaranteed, while the reflection may be incomplete due to factors such as manufacturing process. Therefore, there may be a buffer area of several nanometers between transmission and reflection. In this buffer area, the transmission or reflection will not be 100%, and it may be transmission or reflection, or may be semi-transmission semi-reflection.

The technical solutions in the present invention are also applicable directly to coexistence of an EPON and a 10GEPON, and relevant details will not be repeated herein.

The above-mentioned is only to illustrate the preferred embodiments but not to limit the present invention. Various alterations and changes to the present invention are apparent to those skilled in the art. Any modification, equivalent substitution and improvement within the spirit and principle of the present invention shall be covered by the scope of protection of the present invention.

INDUSTRIAL APPLICABILITY

The Wavelength Division Multiplexing Filter (WDM1r) in the present invention realizes coexistence of different Passive Optical Networks and an optical line detecting system, and can detect a fault in real time without interrupting the service, thus saving a lot of maintenance costs for the operators.

What is claimed is:

1. A wavelength division multiplexing filter, the wavelength division multiplexing filter includes a plurality of filters and is configured to:
   in a downlink direction, receive a first optical pulse signal outputted by a first passive optical network (PON) system, a second optical pulse signal outputted by a second PON system or a second optical pulse signal gained by coupling an output signal of the second PON system and a video signal, and a third optical pulse signal sent from an optical time domain reflectometer (OTDR); and couple the first optical pulse signal, the second optical pulse signal and the third optical pulse signal into an optical division network (ODN); and
   in an uplink direction, split an uplink optical pulse signal according to wavelength bands; and transmit an optical pulse signal in a first uplink wavelength range to the first PON system, transmit an optical pulse signal in a second uplink wavelength range to the second PON system, and transmit an optical signal in a third uplink wavelength range to the OTDR,
   so as to realize wavelength division multiplexing of different PON systems and an optical line detecting system;
   wherein the wavelength division multiplexing filter consists of a broadband filter and a side band filter, wherein the broadband filter transmits all light of a wavelength of 1290 nm-1500 nm, and reflects all light of other wavelengths; and the side band filter transmits all light of a wavelength not less than 1625 nm, and reflects all light of a wavelength less than this wavelength; and
   a pass interface of the broadband filter is an interface connected with an optical line terminal (OLT) of the first PON system, a common interface of the broadband filter is an interface connected with a main optical fiber of the ODN, a reflection interface of the broadband filter is connected with a common interface of the side band filter, a reflection interface of the side band filter is an interface connected with an OLT of the second PON system, and a pass interface of the side band filter is an interface connected with the OTDR.

2. The wavelength division multiplexing filter according to claim 1, wherein
   the wavelength of the third optical pulse signal is not less than 1625 nm; and
   the wavelength division multiplexing filter is further configured to: in a downlink direction, receive a reflection signal of the third optical pulse signal sent from the ODN, wherein the wavelength of the reflection signal is not less than 1625 nm.

3. The wavelength division multiplexing filter according to claim 1, wherein
   the reflection interface of the side band filter and the OLT of the second PON system are connected via a coupler; and
   the reflection interface of the side band filter is configured to: in a downlink, input an optical pulse signal gained by coupling an output signal of the OLT of the second PON system and a video signal, and in an uplink, output an optical pulse signal to the OLT of the second PON system.

4. The wavelength division multiplexing filter according to claim 1, wherein
   a wavelength range of the first optical pulse signal comprises 1480 nm-1500 nm; and a wavelength range of the second optical pulse signal comprises 1510 nm-1615 nm.

5. The wavelength division multiplexing filter according to claim 1, wherein
the first uplink wavelength range comprises 1290 nm-1360 nm; the second uplink wavelength range comprises: not more than 1280 nm; and the third uplink wavelength range comprises: not less than 1625 nm.

6. The wavelength division multiplexing filter according to claim 1, wherein
the first PON system is a gigabit passive optical network (GPON), and the second PON system is a 10 gigabit passive optical network (XGPON1); or
the first PON system is an ethernet passive optical network (EPON), and the second PON system is a 10 gigabit ethernet passive optical network (10GEPON).

7. A wavelength division multiplexing filter, the wavelength division multiplexing filter includes a plurality of filters and is configured to:
in a downlink direction, receive a first optical pulse signal outputted by a first passive optical network (PON) system, a second optical pulse signal outputted by a second PON system or a second optical pulse signal gained by coupling an output signal of the second PON system and a video signal, and a third optical pulse signal sent from an optical time domain reflectometer (OTDR); and couple the first optical pulse signal, the second optical pulse signal and the third optical pulse signal into an optical division network (ODN); and
in an uplink direction, split an uplink optical pulse signal according to wavelength bands; and transmit an optical pulse signal in a first uplink wavelength range to the first PON system, transmit an optical pulse signal in a second uplink wavelength range to the second PON system, and transmit an optical signal in a third uplink wavelength range to the OTDR,
so as to realize wavelength division multiplexing of different PON systems and an optical line detecting system;
wherein the wavelength division multiplexing filter consists of a double-window fiber bragg grating (FBG) filter and a side band filter, and wherein
the FBG filter has two windows in which a first window transmits all light of a wavelength of 1290 nm-1360 nm, and the second window transmits all light of a wavelength of 1480 nm-1500 nm, and reflects all light of other wavelengths; and the side band filter transmits all light of a wavelength not less than 1625 nm, and reflects all light of a wavelength less than this wavelength; and
a pass interface of the FBG filter is an interface connected with an OLT of the first PON system, a common interface of the FBG filter is an interface connected with a main optical fiber of the ODN, a reflection interface of the FBG filter is connected with a Common interface of the side band filter, a reflection interface of the side band filter is an interface connected with an OLT of the second PON system, and a pass interface of the side band filter is an interface connected with the OTDR.

8. The wavelength division multiplexing filter according to claim 7, wherein
the wavelength of the third optical pulse signal is not less than 1625 nm; and
the wavelength division multiplexing filter is further configured to: in a downlink direction, receive a reflection signal of the third optical pulse signal sent from the ODN, wherein the wavelength of the reflection signal is not less than 1625 nm.

9. The wavelength division multiplexing filter according to claim 7, wherein
the reflection interface of the side band filter and the OLT of the second PON system are connected via a coupler, and
the reflection interface of the side band filter is configured to: in a downlink, input an optical pulse signal gained by coupling an output signal of the OLT of the second PON system and a video signal, and in an uplink, output an optical pulse signal to the OLT of the second PON system.

10. The wavelength division multiplexing filter according to claim 7, wherein
a wavelength range of the first optical pulse signal comprises 1480 nm-1500 nm; and a wavelength range of the second optical pulse signal comprises 1510 nm-1615 nm.

11. The wavelength division multiplexing filter according to claim 7, wherein
the first uplink wavelength range comprises 1290 nm-1360 nm; the second uplink wavelength range comprises: not more than 1280 nm; and the third uplink wavelength range comprises: not less than 1625 nm.

12. The wavelength division multiplexing filter according to claim 7, wherein
the first PON system is a gigabit passive optical network (GPON), and the second PON system is a 10 gigabit passive optical network (XGPON1); or
the first PON system is an ethernet passive optical network (EPON), and the second PON system is a 10 gigabit ethernet passive optical network (10GEPON).

* * * * *